United States Patent Office 3,351,593
Patented Nov. 7, 1967

3,351,593
PREPARATION OF METHYLENE
BISTETRAFORMALTRISAZINE
Henry Moe, Sacramento, and Bernard B. Lampert, Carmichael, Calif., assignors, by mesne assignments, to the United States of America as represented by the Secretary of the Navy
No Drawing. Filed Oct. 6, 1966, Ser. No. 585,219
3 Claims. (Cl. 260—241)

ABSTRACT OF THE DISCLOSURE

Nitrogen-rich hydrazine-formaldehyde type compounds which are simple to prepare and may, among their uses, be used as additives to rocket propellant systems.

This invention relates to novel nitrogen-rich compounds, particularly to the preparation of methylene bistetraformaltrisazine and polymers derived therefrom.

In the field of solid propellants extensive research is continually in progress looking toward the discovery of substances possessing unique properties which can be used to advantage in increasing the effective specific impulse without increasing propellant detonability or toxicity. Nitrogen-rich additives capable of increasing the heat of formation, the hydrogen content and density are needed. The present invention provides new compounds which supply this need.

It is, therefore, an object of the present invention to provide nitrogen-rich compounds for use as additives in rocket propellant systems.

Another object is to provide a means for preparing nitrogen-rich compounds which is simple and economical.

Still another object is to provide a nitrogen-rich additive which is compatible with solid propellant components.

Other objects, features and many of the attendant advantages of this invention will become readily appreciated as the same become better understood by reference to the following detailed description.

It is known that other hydrazine-formaldehyde products have been prepared wherein the molar concentration of formaldehyde employed was greater than the molar concentration of hydrazine. With a hydrazine/formaldehyde molar ratio of 3:4, Hofmann and Storm in 1912 (Ber., 45 1725 (1912)) obtained tetraformaltrisazine. Previously, Pulvermacher in 1893 (Ber. Deut. Chem., vol. 26, (1893), 4 pp.) prepared an amorphous polymer of undetermined structure with an empirical formula corresponding to a hydrazine/formaldehyde ratio of 1:2. On the basis of comparative infrared spectroscopy, elemental analysis, and the method of preparation the structure poly(dimethylenetetraformaltrisazine) has been assigned to the amorphous polymer of Pulvermacher. Neureiter in Patent No. 3,067,252 which issued on December 4, 1962 discloses the preparation of 2,3-diaza-1,3-diene by reacting about 2 moles of formaldehyde with about 1 mole of hydrazine.

The present invention is for new compounds, methylene bistetraformaltrisazine and poly(methylenetetraformaltrisazine), which were prepared in accordance with the following preferred procedure, comprising (a) reacting 2 moles of hydrazine with 3 moles of formaldehyde at below 40° C. to form methylene bistetraformaltrisazine; and (b) reacting equimolar amounts of the methylene bistetraformaltrisazine and formaldehyde at 25° C. for 24 hours to form poly(methylenetetraformaltrisazine).

The following examples are given to illustrate the invention and should not be construed as limiting it.

EXAMPLE I

*Preparation of methylene bistetraformaltrisazine directly from hydrazine and formaldehyde*

To 32 g. (1 mole) of anhydrous hydrazine was added directly 85 g. (1.5 mole) of Methyl Formcel, the tradename for 53% by weight formaldehyde in methanol solution. The temperature must be kept below 40° C. The mixture was stirred for an hour then concentrated at 50° C./15 mm. Hg to give 44 g. (88% yield) of a white product having a melting point of 285° C. The melting point and infrared spectrum confirmed the compound, which has the following structure formula:

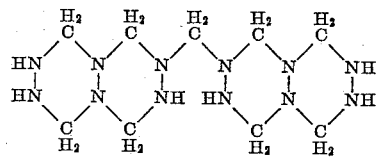

EXAMPLE II

*Preparation of methylene bistetraformaltrisazine from tetraformaltrisazine from tetraformaltrisazine and formaldehyde*

3 g. (0.05 mole) of Methyl Formcel (53% by weight formaldehyde in methanol solution) were added to a solution of 14.4 g. (0.1 mole) of tetraformaltrisazine in 100 ml. of water at 25° C. The solution was allowed to stand for 24 hours and then evaporated under vacuum. The residue was dried at 100° C. and 0.5 mm. Hg pressure to give 14.8 g. (98% yield) of the white product.

Methylene bistetraformaltrisazine has particular application as an additive to propellants to increase specific impulse, since it has a high endothermic heat of formation, 61.5 Kcal./100 g.; high hydrogen content, 7.8175 g./atom/100 g.; high nitrogen content, 3.39392 g./atoms/100 g.; high density, 1.39/cc.; high melting point, 285° C.; is almost neutral in pH; and is potentially inexpensive.

EXAMPLE III

*Preparation of poly(methylenetetraformaltrisazine) from bistetraformaltrisazine and formaldehyde*

To a stirred slurry of 6.0 g. (0.02 mole) of methylene bistetraformaltrisazine in 50 ml. of water and 25 ml. of methanol was added 1.1 g. (0.02 mole) of Methyl Formcel. After standing for 24 hours at 25° C. the slurry was concentrated, filtered and dried to give 6.0 g. (96% yield) of a white product having a melting point of 290° C. The structural formula is as follows:

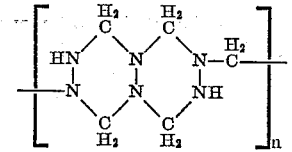

EXAMPLE IV

*Preparation of poly(methylenetetraformaltrisazine) from hydrazine and formaldehyde*

To 3 moles of anhydrous hydrazine, 5 moles of formaldehyde were added keeping the temperature below 40° C. The mixture was stirred for an hour and concentrated. The residue was dried to give a good yield of the desired polymer.

EXAMPLE V

*Preparation of poly(methylenetetraformaltrisazine) from tetraformaltrisazine and formaldehyde*

A solution of 29 g. (0.2 mole) of tetraformaltrisazine in 200 ml. of water and 50 ml. of methanol was treated with 12 g. (0.2 mole) of Methyl Formcel. After 24 hours at 25° C. the mixture was concentrated and the residue dried to give 29 g. (92% yield) of the polymer.

Poly(dimethylenetetraformaltrisazine), a known nitrogen-rich additive can be easily prepared by reacting 1 mole of bistetraformaltrisazine and 3 moles of formaldehyde. It has been previously prepared by Pulvermacher (herein mentioned) by reacting 1 mole of hydrazine with 2 moles of formaldehyde. The polymer also results when equimolar solutions of polymethylenetetraformaltrisazine and formaldehyde are mixed together. It also results from mixing 1 mole of tetraformaltrisazine with 2 moles of formaldehyde.

A reaction sequence showing the molar ratio of the reactants and the interrelationships of the products is presented below:

Obviously many modifications and variations of the present invention are possible in the light of the above teachings. It is therefore to be understood that within the scope of the appended claims the invention may be practiced otherwise than as specifically described.

What is claimed is:
1. Methylene bistetraformaltrisazine.
2. A method for preparing the compound of claim 1 which comprises
   reacting 2 moles of hydrazine with 3 moles of formaldehyde at below 40° C.
3. A method for preparing the compound of claim 1 which comprises
   reacting 1 mole of formaldehyde with 2 moles of tetraformaltrisazine at 25° C. for about 24 hours.

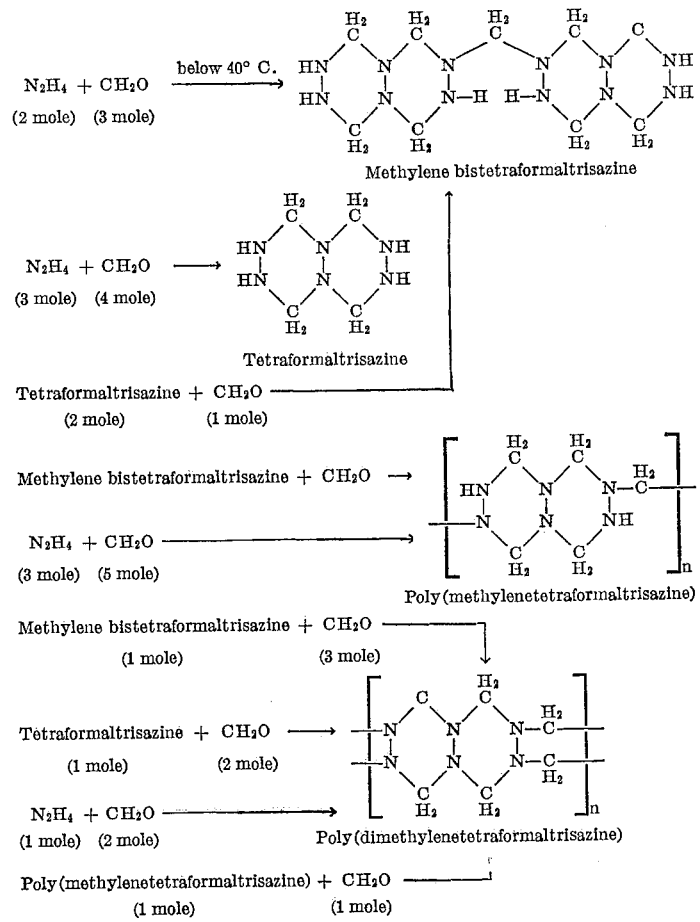

References Cited

UNITED STATES PATENTS 3,244,702  4/1966  Marcus _____ 149—36 XR

OTHER REFERENCES

Byrkit et al.: Ind. and Eng. Chem., vol. 42, pp. 1869 to 1871 (1950).

Erickson et al.: The 1,2,3- and 1,2,4-triazines, Tetrazines and Pentazines, Interscience Publishers, Inc., New York, 1956, pp. 244, 245 and 247.

WALTER A. MODANCE, *Primary Examiner.*

CARL D. QUARFORTH, *Examiner.*

L. A. SEBASTIAN, *Assistant Examiner.*